US006210778B1

(12) United States Patent
Poirier et al.

(10) Patent No.: US 6,210,778 B1
(45) **Date of Patent: *Apr. 3, 2001**

(54) LASER PRINTING FOR HARSH ENVIRONMENTS

(75) Inventors: David J. Poirier, New Ipswich; Vincent J. Piemonte, Salem, both of NH (US); Robert F. Worthen, North Andover, MA (US)

(73) Assignee: Worthen Industries, Inc., Nashua, NH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,950

(22) Filed: Nov. 16, 1998

Related U.S. Application Data

(62) Division of application No. 08/881,894, filed on Jun. 24, 1997, now Pat. No. 5,885,398.

(51) Int. Cl.[7] ..................... B32B 27/14

(52) U.S. Cl. ..................... 428/195; 428/204; 442/231

(58) Field of Search ..................... 428/202, 204, 428/200, 331, 520, 207, 332, 195, 267; 427/148, 152; 442/286, 394, 231; 156/131, 277

(56) References Cited

U.S. PATENT DOCUMENTS

| | | | | |
|---|---|---|---|---|
| 3,988,343 | * | 10/1976 | Lilyquist | 260/29.6 |
| 3,992,559 | * | 11/1976 | Day et al. | 428/200 |
| 4,177,586 | * | 12/1979 | Ogawa et al. | 40/2 R |
| 4,211,021 | * | 7/1980 | Amprim et al. | 40/2 R |
| 4,541,340 | * | 9/1985 | Peart et al. | 101/470 |
| 4,935,288 | * | 6/1990 | Honaker et al. | 478/207 |
| 5,314,560 | * | 5/1994 | Pritchet | 156/238 |

* cited by examiner

*Primary Examiner*—Merrick Dixon
(74) *Attorney, Agent, or Firm*—Samuels, Gauthier & Stevens

(57) ABSTRACT

Permanent care label fabric is coated with a water-based acrylic or acrylic/urethane coating. The coating is dried and the coated fabric is fed into a standard laser printer. The permanent care instructions are laser printed on the coated fabric and the print meets the AATCC test methods 143–1992 and 61–1993.

4 Claims, 1 Drawing Sheet

LASER PRINTING FOR HARSH ENVIRONMENTS

CROSS-REFERENCES TO RELATED APPLICATIONS

This application is a division of Application Ser. No. 08/881,894, filed Jun. 24, 1997, now Pat. No. 5,885,398.

BACKGROUND AND BRIEF SUMMARY OF THE INVENTION

In the garment industry there are certain labeling requirements. Labels must identify the source of origin of the garment, the materials of construction and the permanent care instructions. These labels are coated fabric labels sewn to the garment. Information on the label with the permanent care instructions must satisfy certain durability requirements as set forth in AATCC test methods 143–1992 and 61–1993. These methods require that the permanent care label must survive a repeated number of washings (launderings) with the permanent care instructions still being legible after the repeated washings.

The permanent care information is typically printed on the labels by hot stamp, thermal transfer, offset flexographic, screen printing or dot matrix printing processes. These printing processes are adequate for the intended purpose for the permanent care labels. Laser printed labels can be produced at speeds comparable to other print labels while allowing an almost limitless variation of information to be printed at a comparably favorable cost. More importantly, the labels can be printed with the high resolution of the laser printers and they can be bar coded in the same or substantially the same printing step as the permanent care instructions. Even if not printed in specifically the same printing step as the permanent care instructions they can be printed on the same label either on the same or reverse side of the printing care instructions. This would then obviate the need to attach a separate bar coded label, such as a hang tag, to the garment. That is, if the bar code can be printed by laser printing with a high degree of resolution it eliminates the need for a separate printing of a bar code on a separate label.

Attempts to date to laser print the fabric typically used for permanent care labels have not been successful primarily because the image printed is blurred and uneven. On some fabrics where the laser print image originally appears clear, the printed image cannot survive the harsh environment demanded of permanent care labels. That is, the laser printed permanent care instructions do not pass the stringent wash requirements.

The present invention is directed to a system and process for laser printing permanent care labels and the labels printed by the system and process. The invention embodies the use of conventional laser printers in combination with coated fabric cut and sized for use in the laser printer. As used in this disclosure ‘printed permanent care labels’ means printed fabric labels which meet or exceed the test requirements of AATCC test methods 143–1992 and 61–1993. Laser printing is well known in the art and need not be described in detail. The present invention embodies using commercially available toners. However, modified toners especially adapted for printing permanent care labels are within the scope of the invention.

The invention, in one embodiment, embodies laser printing permanent care labels. In addition to the care instructions, a bar code can be printed on the label. The labels are coated fabrics. The coating allows both the care instructions to be printed to meet the commonly accepted standards and the bar code to be printed with sufficient clarity and definition such that the printed bar code can be scanned by commercially available readers. The printing of the fabric by the laser printer is optionally followed by an additional fusion step.

The print definition on the coated garment care label stock is of sufficient resolution (300 dots per inch minimum) and density to meet the format requirements of bar code standards as put forth by such groups as the American National Standards Institute, the Department of Defense, the Automotive Industry Action Group, etc. The print definition is sharp enough to accommodate the most common bar code symbologies, i.e. Code 128, Code 3 or 9 (in three pitches), UPC/EAU USPS Bar Code and Interlaced 2 of 5.

The base fabrics of the permanent care label stocks are woven polyester, nylons, polycottons, acetates and non-wovens of various weights and deniers. A typical coated fabric for the laser print application would be a 1.65 ounce polyester overcoated with a water-based acrylic or acrylic/urethane coating. The coated fabric may be supplied in perforated, fanfolded configuration or in roll form. Any one of these fabrics may find a use in the laser printed label business segment. Currently, the acetates and non-wovens are used in computer dot matrix print applications. They are chosen based on their ability to be easily perforated and hole punched into pin feed fanfolded configurations. The coatings applied to the base fabrics are of the generic waterbased acrylic and acrylic/urethane types. However, specially formulated coatings for laser print end use are within the scope of the invention.

DESCRIPTION OF THE PREFERRED EMBODIMENTS

Figure 1:
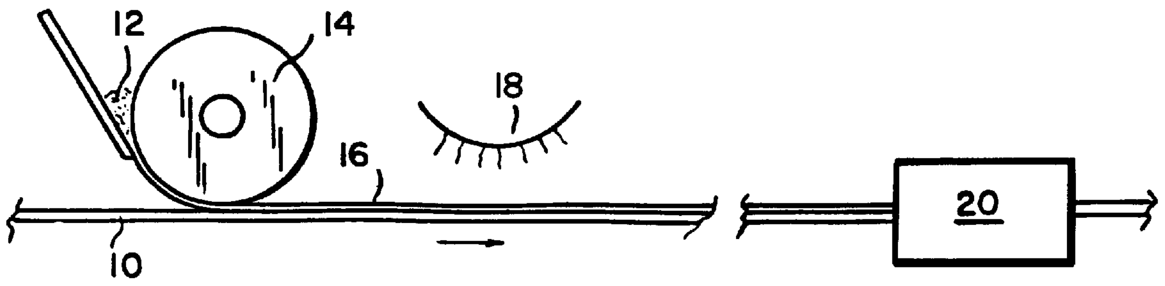
FIG. 1 is a process flow diagram of an embodiment of the invention.

The invention comprises a coated fabric which is especially suitable for laser printing for permanent care labels. It has been discovered that the proper combination of fabric and coating in addition to forming a laser printed permanent care label can also be bar coded.

Fabrics found or believed suitable for purposes of the invention are 100% polyesters, weights of 1.2 to 3.0 ounces per square yard, deniers of 50 to 150; 100% nylons, weights of 1.2 to 3.0 ounces per square yard, deniers of 50 to 100; 100% acetates, weights of 2.0 to 3.5 ounces per square yard, deniers of 75 to 150; polycottons, weights of 2.5 to 3.5 ounces per square yard, size 30 cotton and up to 150 denier polyester; nonwovens, spun bonded and/or wet laid non-woven fabrics of polyolefins, polyesters, nylons, rayons and/or cellulosic fiber content, weights of 1.0 to 3.0 ounces per square yard; and any blends of the above.

Suitable coatings are Upaco Adhesives, Inc. (Division of Worthen Industries) WN-190 white label coating, an aqueous aliphatic polyurethane coating containing functional fillers, pigments and additives; and Upaco WN-253, an aqueous carboxylated acrylic/aliphatic polyester polyurethane blend containing functional fillers, pigments and additives; and a variety of aqueous acrylic and/or acrylic-urethane polymers compounded for specific end properties which lend themselves to laser printing and subsequent repeated launderings with additive packages that impart specific and unique properties to the coatings. Such additive packages could include some or all of the following: organic surfactants (soaps, silicones, petroleum distillates, polyoxyalkenes); inorganic fillers (oxides and/or salts of Ti, Mg, Ca, Si, Al); esters and polyesters; polyacrylates; melamine formaldehyde; polyaziridine; optical brighteners; natural and synthetic rubber modifiers.

These coatings are applied to the fabrics at weights ranging from 1.0 to 4.0 dry ounces per square yard.

After the fusion step the laser printed fabric will meet the permanent care label requirements. Typically, if a laser printed fabric does not meet the permanent care label requirements, optional post fusion steps can be employed. There are several optional post fusion steps which can be used if desired.

Toner fusion can be accomplished by any one of four standard commercially available methods, pressure, Xenon flash lamp, radiant heat and heat and pressure.

Pressure fusion is a process of making a toned image permanently fused to the coated fabric by means of a pair of high pressure rollers. The pressure exerted by these rollers is typically in the range of 2000 to 5000 pounds per square inch with a dwell time of 0.1 to 2.0 seconds.

Xenon flash fusion is a process of making a toned image permanently fused to the coated fabric by subjecting the image to high energy pulses of light allowing the toner to partially soften and become permanently fused to the fabric. The light sources required are of the 500 to 3000 watt capacities with dwell times of 0.1 to 2.0 seconds.

Radiant heat fusing is a process of making a toned image permanently fused to the coated fabric by heating with high temperature lamps and/or coils without contacting the fabric. An example of this type of lamp would be a quartz halogen lamp which operates in the range of 1000 to 4000 watts with a dwell time of 0.1 to 2.0 seconds.

Hot pressure fusing is a process of making a toned image permanently fused to the coated fabric by the application of heat and pressure. The heat and pressure are applied by rollers exerting 75 to 200 PSI with one of the rolls heated to 100 to 250EC with a dwell time of 0.1 to 2.0 seconds.

Figure 2:
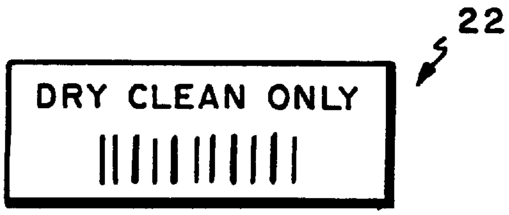
FIG. 2 is a label of the invention.

Referring to FIG. 1 a fabric 10 has a coating 12 applied thereon by a knife over roll 14 to form a coated fabric 16. The coated fabric 16 is dried by a heater 18. The dried fabric 18 is cut (not shown) and printed in a laser printer 20. A printed label 22 is shown in FIG. 2.

EXAMPLES

The following fabrics were coated with either the Upaco coating WN-190 or WN-253. The coatings were applied by knife over roll technique. The wet coating was dried at 220–260EF by an overhead heater. The dried coated fabric was cut to size in order that it could be placed in the manual feed tray of the laser printer. The permanent care instructions were laser printed on the coated fabric without any modification to the laser printer. That is, the coated fabric was printed as would be any ordinary paper stock labels singly or side-by-side. Further, the toners used were those that are customarily provided with the laser printer.

All labels laser printed in Examples 1–4 met or exceeded the requirements of AATCC test methods 143–1992 or 61–1993. Further, where bar codes were laser printed on the coded fabric they also met industry standards.

| | |
|---|---|
| Fabric | polyester 70/50 denier - 1.45 oz/yd$^2$ |
| Coating | WN-253 approximately 2.5 oz/yd$^2$ dry |
| Laser printer | Hewlett Packard, Canon, Brother and OTC |

| | |
|---|---|
| Fabric | polyester 70/100 denier - 1.80 oz/yd$^2$ |
| Coating | WN-253 approximately 2.5 oz/yd$^2$ dry |
| Laser printer | Hewlett Packard, Canon, Brother and OTC |

| | |
|---|---|
| Fabric | polyester 70/50 denier 1.45 oz/yd$^2$ |
| Coating | WN-190 approximately 2.5 oz/yd$^2$ dry |
| Laser printer | Hewlett Packard, Canon, Brother and OTC |

| | |
|---|---|
| Fabric | polyester 70/100 denier - 1.80 oz/yd$^2$ |
| Coating | WN-190 approximately 2.5 oz/yd$^2$ dry |
| Laser printer | Hewlett Packard, Canon, Brother and OTC |

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. A permanent care label comprising a coated fabric having laser printing thereon, the label characterized in that it meets or exceeds AATCC test methods 143–1992 or 61–1993.

2. The label of claim 1 wherein the coating is selected from the group consisting of aqueous aliphatic polyurethanes, aqueous carboxylated acrylic/aliphatic polyester polyurethane blends, aqueous acrylic and/or acrylic-urethane polymers.

3. A permanent care label comprising a coated fabric having a bar code laser printed thereon, the bar code characterized in that it is of sufficient clarity and definition such that it may be scanned by electronic readers.

4. The permanent care label of claims 2 or 3 wherein the fabric is selected from the group consisting of polyesters, nylons, acetates, polycottons, nonwovens, spun bonded and/or wet laid nonwoven fabrics of polyolefins, polyester, nylons, rayons and/or cellulosic fibers.

* * * * *